US012610111B2

(12) United States Patent　(10) Patent No.:　US 12,610,111 B2

Sui et al.　(45) Date of Patent:　Apr. 21, 2026

(54) VIDEO PROCESSING

(71) Applicant: BEIJING DUYOU INFORMATION TECHNOLOGY CO., LTD., Beijing (CN)

(72) Inventors: Zonggui Sui, Beijing (CN); Xing Dai, Beijing (CN); Lei Yuan, Beijing (CN); Wengui Cai, Beijing (CN)

(73) Assignee: BEIJING DUYOU INFORMATION TECHNOLOGY CO., LTD., Beijing (CN)

( * ) Notice: Subject to any disclaimer, the term of this patent is extended or adjusted under 35 U.S.C. 154(b) by 137 days.

(21) Appl. No.: 18/630,905

(22) Filed: Apr. 9, 2024

(65) Prior Publication Data

US 2024/0259652 A1　Aug. 1, 2024

(30) Foreign Application Priority Data

Apr. 10, 2023　(CN) .......................... 202310377697.3

(51) Int. Cl.
| | |
|---|---|
| *H04N 21/24* | (2011.01) |
| *H04N 21/25* | (2011.01) |
| *H04N 21/258* | (2011.01) |
| *H04N 21/439* | (2011.01) |
| *H04N 21/442* | (2011.01) |
| *H04N 21/45* | (2011.01) |
| *H04N 21/472* | (2011.01) |
| *H04N 21/81* | (2011.01) |
| *H04N 21/845* | (2011.01) |

(52) U.S. Cl.
CPC ..... *H04N 21/8456* (2013.01); *H04N 21/4394* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 6,424,725 | B1 * | 7/2002 | Rhoads | H04N 1/3232 |
| | | | | 704/E19.009 |
| 11,120,839 | B1 | 9/2021 | Siagian et al. | |
| 2005/0249412 | A1 * | 11/2005 | Radhakrishnan | G06F 16/785 |
| | | | | 382/173 |
| 2015/0082349 | A1 * | 3/2015 | Ishtiaq | H04N 21/4316 |
| | | | | 725/40 |
| 2019/0035431 | A1 * | 1/2019 | Attorre | G10L 25/30 |
| 2020/0097731 | A1 | 3/2020 | Gupta et al. | |
| 2020/0213686 | A1 | 7/2020 | Li | |

(Continued)

FOREIGN PATENT DOCUMENTS

| | | |
|---|---|---|
| CN | 106919662 A | 7/2017 |
| CN | 109547859 A | 3/2019 |
| CN | 110213670 A | 9/2019 |

(Continued)

*Primary Examiner* — Brian T Pendleton
*Assistant Examiner* — Jean D Saint Cyr
(74) *Attorney, Agent, or Firm* — Seed IP Law Group LLP

(57) ABSTRACT

A method is provided that includes: obtaining playback behavior data of a video to be processed; determining, based on the playback behavior data, a target video segment in which a content segmentation point of the video is located; extracting an audio feature of the target video segment; and determining the content segmentation point from the target video segment based on the audio feature.

17 Claims, 5 Drawing Sheets

(56)             References Cited

U.S. PATENT DOCUMENTS

2021/0120319 A1     4/2021   Zhou et al.

FOREIGN PATENT DOCUMENTS

| | | |
|---|---|---|
| CN | 110782920 A | 2/2020 |
| CN | 111400511 A | 7/2020 |
| CN | 111757170 A | 10/2020 |
| CN | 113347489 A | 9/2021 |
| CN | 113420182 A | 9/2021 |
| CN | 113468375 A | 10/2021 |
| CN | 113992970 A | 1/2022 |
| CN | 114125566 A | 3/2022 |
| JP | 2007066409 A | 3/2007 |
| JP | 2007067522 A | 3/2007 |
| JP | 2007208651 A | 8/2007 |
| JP | 2012195025 A | 10/2012 |
| KR | 20230034645 A | 3/2023 |
| WO | 2013080449 A1 | 6/2013 |

* cited by examiner

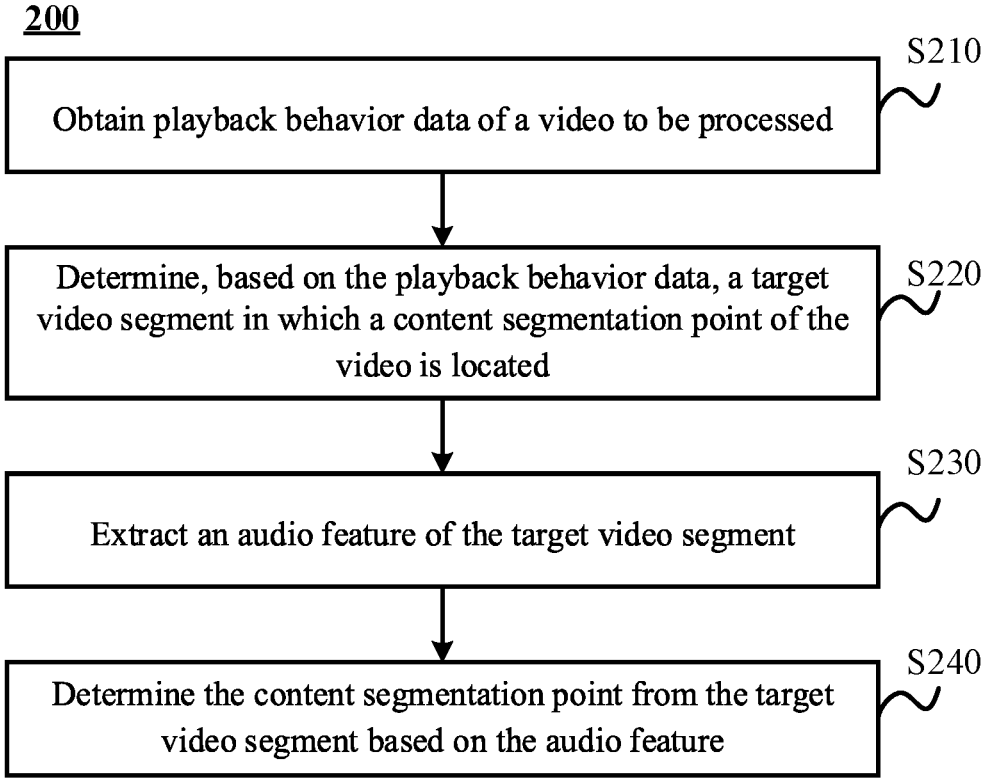

200

S210 — Obtain playback behavior data of a video to be processed

S220 — Determine, based on the playback behavior data, a target video segment in which a content segmentation point of the video is located S230 — Extract an audio feature of the target video segment S240 — Determine the content segmentation point from the target video segment based on the audio feature

FIG. 2

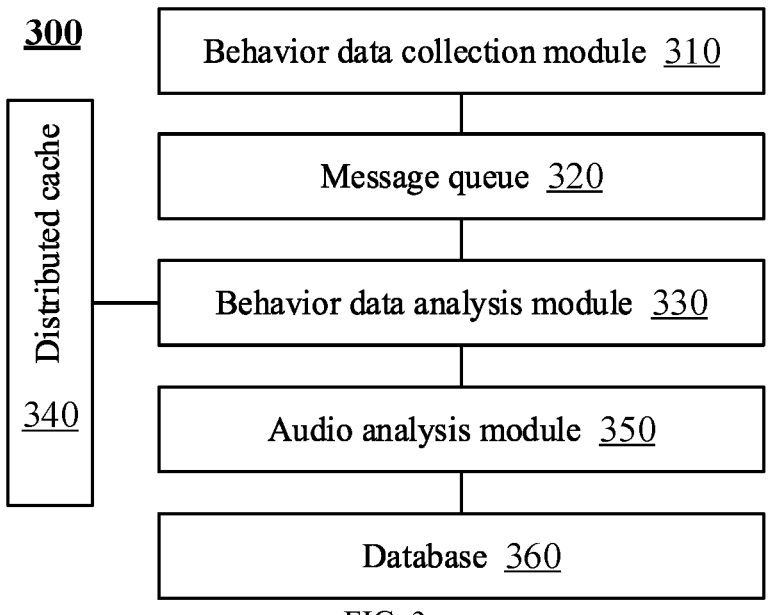

300

Behavior data collection module 310

Message queue 320

Behavior data analysis module 330

Audio analysis module 350

Database 360

Distributed cache 340

VIDEO PROCESSING

CROSS-REFERENCE TO RELATED APPLICATIONS

This application claims priority to Chinese patent application No. 202310377697.3, filed on Apr. 10, 2023, the contents of which are hereby incorporated by reference in their entirety for all purposes.

TECHNICAL FIELD

The present disclosure relates to the field of computer technologies, in particular to the field of multimedia technologies, and specifically to a video processing method, an electronic device, and a computer-readable storage medium.

BACKGROUND

A video may include different types of content, for example, opening credits, main content (a main body of the video), an advertisement, and closing credits. A user has varying levels of interest in different types of content. Locating different types of content in the video facilitates the user to browse content that the user is interested in.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, a video processing method is provided, including: obtaining playback behavior data of a video to be processed; determining, based on the playback behavior data, a target video segment in which a content segmentation point of the video is located, where a type of video content before the content segmentation point is different from a type of video content after the content segmentation point; extracting an audio feature of the target video segment; and determining the content segmentation point from the target video segment based on the audio feature.

According to an aspect of the present disclosure, an electronic device is provided, including: a processor; and a memory communicatively connected to the processor, where the memory stores instructions executable by the processor, and the instructions, when executed by the processor, cause the processor to perform operations comprising: obtaining playback behavior data of a video to be processed; determining, based on the playback behavior data, a target video segment in which a content segmentation point of the video is located, where a type of video content before the content segmentation point is different from a type of video content after the content segmentation point; extracting an audio feature of the target video segment; and determining the content segmentation point from the target video segment based on the audio feature.

According to an aspect of the present disclosure, a non-transitory computer-readable storage medium storing computer instructions is provided, where the computer instructions are configured to enable a computer to perform operations comprising: obtaining playback behavior data of a video to be processed; determining, based on the playback behavior data, a target video segment in which a content segmentation point of the video is located, where a type of video content before the content segmentation point is different from a type of video content after the content segmentation point; extracting an audio feature of the target video segment; and determining the content segmentation point from the target video segment based on the audio feature.

BRIEF DESCRIPTION OF THE DRAWINGS

The accompanying drawings show example embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

FIG. 2 is a flowchart of a video processing method according to some embodiments of the present disclosure;

FIG. 3 is a schematic diagram of a video processing system according to some embodiments of the present disclosure;

DETAILED DESCRIPTION OF EMBODIMENTS

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described here, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms.

In the technical solutions of the present disclosure, obtaining, storage, application, etc. of personal information of a user all comply with related laws and regulations and are not against the public order and good morals.

During a process of playing a video, a user usually skips content that the user is not interested in, for example, opening credits, closing credits, and an advertisement, and only watch main content. In the related art, segmentation points of video content (for example, positions of opening credits, closing credits, and an advertisement) are usually manually marked by a video producer or an operator of a video playback platform, which is inefficient and has high labor costs.

In view of the problem described above, embodiments of the present disclosure provides a video processing method. The method can realize efficient and accurate segmentation of video content.

The embodiments of the present disclosure will be described below in detail with reference to the accompanying drawings.

Figure 1:
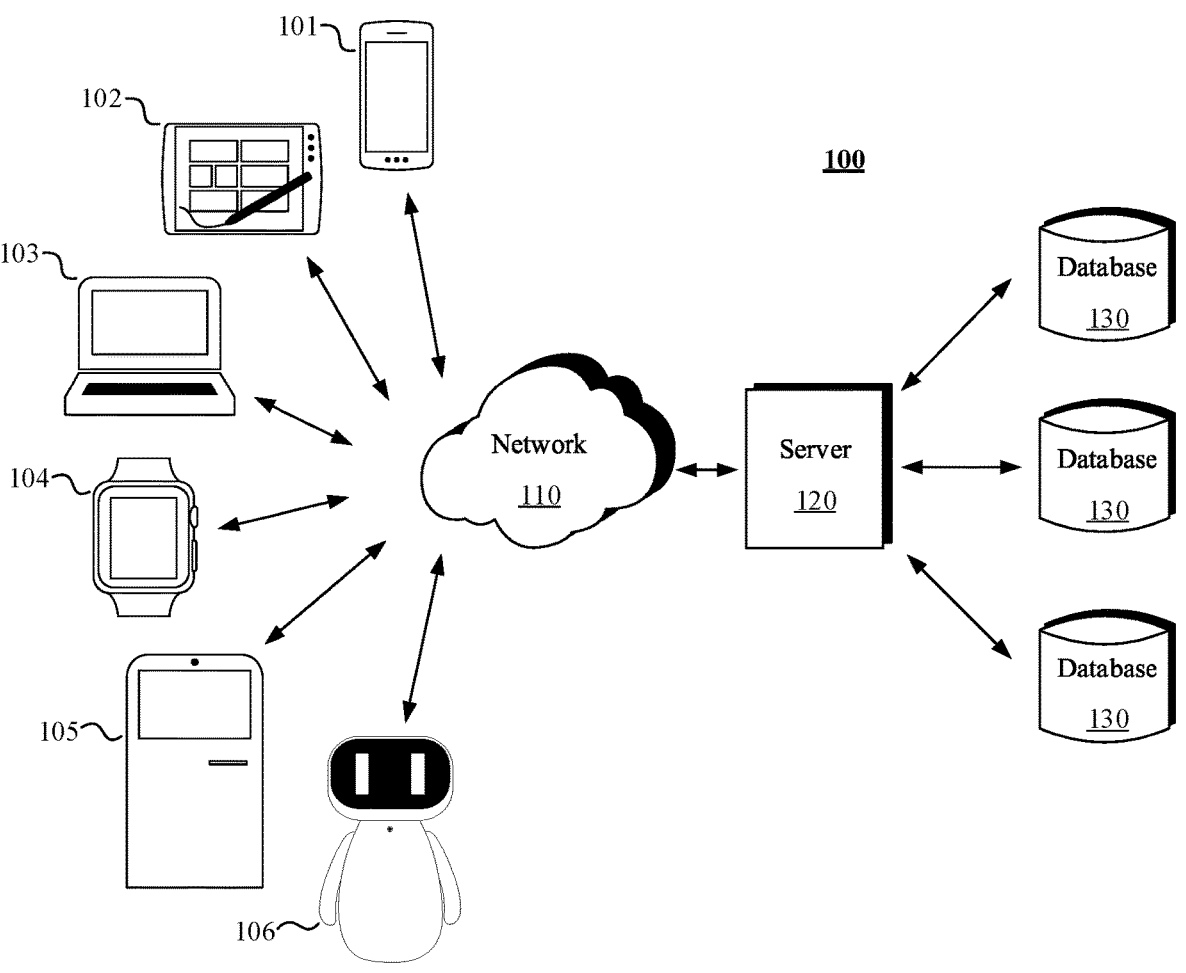
FIG. 1 is a schematic diagram of an example system in which various methods described herein can be implemented according to some embodiments of the present disclosure.

FIG. 1 is a schematic diagram of an example system 100 in which various methods and apparatuses described herein can be implemented according to some embodiments of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more applications.

In some embodiments of the present disclosure, the client devices 101, 102, 103, 104, 105, and 106, and the server 120 may run one or more services or software applications that cause a video processing method in some embodiments of the present disclosure to be performed.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client devices 101, 102, 103, 104, 105, and/or 106 may sequentially use one or more client application programs to interact with the server 120, to use the services provided by these components. It should be understood that various different system configurations are possible, and may be different from that of the system 100. Therefore, FIG. 1 is an example of the system for implementing various methods described herein, and is not intended to be limiting.

The client devices 101, 102, 103, 104, 105, and/or 106 may provide an interface that enables the user of the client device to interact with the client device. The client device may also output information to the user via the interface. Although FIG. 1 shows only six client devices, those skilled in the art will understand that any number of client devices are supported in the present disclosure.

The client devices 101, 102, 103, 104, 105, and/or 106 may include various types of computer devices, for example, a portable handheld device, a general-purpose computer (for example, a personal computer and a laptop computer), a workstation computer, a wearable device, a smart screen device, a self-service terminal device, a service robot, a vehicle-mounted device, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system; or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or Wi-Fi), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that the various methods and apparatuses described according to the present disclosure can be applied.

According to some embodiments, the client devices 101 to 106 may include a client application for playing videos (for example, a network disk client or a video client). Correspondingly, the server 120 is a server corresponding to the client application. The server 120 can determine content segmentation points of a video, for example, an opening credits end point, a closing credits start point, and an advertisement end point, by performing the video processing method in the embodiments of the present disclosure. The determined content segmentation points of the video may be associated with the video and stored in the database 130. When the client devices 101 to 106 initiate a playback request for the video, the server 120 may return video data of the video to the user along with the content segmentation points of the video to the user, so that the client devices 101 to 106 can play the video. When the client devices 101 to 106 play the video, content such as the opening credits and the closing credits can be automatically or manually (that is, based on a selection of the user) skipped based on the content segmentation points of the video, thereby enhancing the user's video playback experience.

In some embodiments, the client devices 101 to 106 may also determine the content segmentation points of the video by performing the video processing method in the embodiments of the present disclosure. These embodiments typically requires the client devices 101 to 106 to have high hardware configurations and computing capabilities.

FIG. 2 is a flowchart of a video processing method 200 according to some embodiments of the present disclosure. As mentioned above, an execution body of the method 200 is typically a server (for example, the above server 120). In some embodiments, the execution body of the method 200 may alternatively be a client device (for example, the above client devices 101 to 106). As shown in FIG. 2, the method 200 includes steps S210 to S240.

In step S210, playback behavior data of a video to be processed is obtained.

In step S220, a target video segment in which a content segmentation point of the video is located is determined based on the playback behavior data. A type of video content before the content segmentation point is different from a type of video content after the content segmentation point.

In step S230, an audio feature of the target video segment is extracted.

In step S240, the content segmentation point is determined from the target video segment based on the audio feature.

According to the embodiments of the present disclosure, an approximate position of a content segmentation point of a video, that is, a target video segment, is determined based on playback behavior data of a user for the video. Subsequently, a precise position of the content segmentation point is determined based on the audio feature of the target video segment. Therefore, efficient and accurate segmentation of video content can be realized.

Each step of the method 200 is described in detail below.

In step S210, the playback behavior data of the video to be processed is obtained.

The video to be processed may include different types of video content, including but not limited to opening credits, main content (that is, a main body of the video), and closing credits. In the embodiments of the present disclosure, time boundary points of the different types of video content are recorded as content segmentation points. A type of video content before the content segmentation point is different from a type of video content after the content segmentation point. The content segmentation point includes, for example, an opening credits end point used to separate the opening credits and the main content (that is, a start point of the main content), and a closing credits start point used to separate the main content and the closing credits (that is, an end point of the main content). In a case where an advertisement is inserted in the main content, the content segmentation point may also include an advertisement end point (that is, the start point of the main content) used to separate the advertisement and the main content.

To improve accuracy of video content segmentation, in step S210, it is usually necessary to obtain playback behavior data of a plurality of users.

The playback behavior data is behavior data generated by the users during the video playback process.

According to some embodiments, the playback behavior data includes, for example, a number of playback times of the video.

According to some embodiments, the playback behavior data includes a type of an interactive operation performed by the user on the video, a playback time point of the video when the user performs the interactive operation on the video, and the like.

The interactive operation performed by the user on the video may be, for example, a playback selection operation. The playback selection operation is used to select from which time point to start playing the video, that is, a playback time point corresponding to the playback selection operation is a playback start time point selected by the user. For example, the playback selection operation may be an operation of dragging a positioning control in a progress bar, that is, a drag operation. The playback time point corresponding to the drag operation is a video time point corresponding to a position of the positioning control when the user ends the drag operation. For another example, the playback selection operation may be an operation of entering, by the user, a selected time point in a text box, that is, a time point input operation. The time point entered by the user is a playback time point corresponding to the time point input operation.

The interactive operation of the user on the video may be, for example, a playback end operation. A playback time point corresponding to the playback end operation is a time point at which the video is located when the user ends the video playback, that is, a playback end time point. Specifically, the playback end operation may be, for example, an operation of closing or exiting a video playback interface.

The playback behavior data of the users can reflect their levels of interest in the video content, thereby reflecting changes in the video content. Therefore, the positions of content segmentation points can be quickly identified based on the playback behavior data of the plurality of users.

In step S220, the target video segment where the content segmentation point of the video is located is determined based on the playback behavior data.

According to some embodiments, as mentioned above, the playback behavior data includes a playback time point at which the video is located when a user performs an interactive operation on the video. Correspondingly, step S220 may include the following steps S222 to S226.

In step S222, the video is divided into a plurality of video segments each with a target duration.

In step S224, for any video segment of the plurality of video segments, a number of interactions of the video segment is determined, where the number of interactions is a number of interactive operations with the playback time point located within the video segment.

In step S226, the target video segment is determined from the plurality of video segments based on the number of interactions of each video segment of the plurality of video segments.

According to the above embodiment, the interactive operation of the user on the video can reflect the user's level of interest in the video content, thereby reflecting the changes in the video content. For example, the user is usually not interested in the video content such as the opening credits, the closing credits, and the advertisement. When the opening credits and the advertisement are played, the user is likely to perform the playback selection operation to skip these video content to watch the main content. When the closing credits is played, the user is likely to perform the playback end operation. Therefore, the approximate position of the content segmentation point can be quickly determined based on the interactive operation of the user.

In step S222, the video to be processed is divided into the plurality of video segments each with a same duration. The duration of each video segment is the target duration. The target duration may be any value, for example, 10 seconds, 30 seconds, or 1 minute. According to some embodiments, the target duration may be positively correlated with a total duration of the video. In other words, the larger the total duration of the video, the larger the target duration is set. Therefore, video processing efficiency can be improved.

In step S224, the number of interactions of each video segment may be determined based on the playback behavior data of the user. The number of interactions of the video segment is a number of interactive operations with the playback time point located within the video segment.

According to some embodiments, different types of interactive operations may be selected to identify different types of content segmentation points, thereby improving accuracy of content segmentation. Correspondingly, specific implementation details of steps S224 and S226 vary for different types of content segmentation points.

According to some embodiments, the playback selection operation may be used to identify the opening credits end point. Correspondingly, the playback behavior data includes a playback time point selected by the user through the playback selection operation, and a continuous playback duration for the user starting from the playback time point. Correspondingly, step S224 may further include steps S2242 and S2244.

In step S2242, an interactive operation with a continuous playback duration greater than a first threshold is determined as a valid interactive operation. The first threshold may be, for example, 3 seconds, or 5 seconds.

In step S2244, a number of valid interactive operations with the playback time point located within the video segment is determined as the number of interactions.

The user is usually not interested in the opening credits. If a continuous playback duration after a playback time point selected by the user is long, it indicates that the user has skipped the opening credits in this operation, that is, has reached the opening credits end point. If a continuous playback duration after a playback time point selected by the user is short and a next playback selection operation is quickly performed by the user, it indicates that the user has not skipped the opening credits in this operation, that is, has not reached the opening credits end point. According to the above embodiment, an invalid interactive operation (not skipping the opening credits) with a short continuous playback duration can be filtered out, thereby improving accuracy of identifying the opening credits.

According to some embodiments, in a case where a content segmentation point to be identified is the opening credits end point, step S226 may include: determining a video segment with a maximum number of interactions within a first time range as the target video segment where the opening credits end point is located. The first time range is a time range from a start point to a first time point of the video. The first time point may be, for example, the $4^{th}$ minute, the $5^{th}$ minute, or another time point of the video.

According to the above embodiment, the target video segment where the opening credits end point is located can be determined from the beginning of the video, thereby improving accuracy of identifying the opening credits.

According to some embodiments, the playback end operation may be used to identify the closing credits start point. Correspondingly, the playback behavior data includes the playback end time point corresponding to the playback end operation. Step S224 may include: determining a number of playback end operations with the playback end time point within a video segment as a number of interactions of the video segment.

According to some embodiments, in a case where the content segmentation point to be identified is the closing credits start point, step S226 may include: determining a video segment with a maximum number of interactions within a second time range as the target video segment where the closing credits start point is located. The second time range is a time range from a second time point to an end point of the video. The second time point may be, for example, the $4^{th}$-to-last minute or the $5^{th}$-to-last minute of the video.

The user is usually not interested in the closing credits. When the video is played to the closing credits, the user usually chooses to finish playing the current video and continues to play a next video or stop playing any video. According to the above embodiment, the target video segment where the closing credits start point is located can be determined at the end of the video, thereby improving accuracy of identifying the closing credits.

According to some embodiments, in a case where the content segmentation point to be identified is an end point of an advertisement, step S224 may include steps S2242 and S2244 described above, and step S226 may include: determining a video segment with a maximum number of interactions within a third time range as the target video segment where the opening credits end point is located. The third time range is a time range from the first time point to the second time point described above.

The user is usually not interested in advertisements inserted in the main content. When an advertisement starts to be played, the user usually drags the progress bar to skip the advertisement content. If a continuous playback duration after a playback time point selected by the user (that is, dragging to a position on the progress bar) is relatively long, it indicates that the user has skipped the advertisement in this operation, that is, has reached the end point of the advertisement. If a continuous playback duration after a playback time point selected by the user is relatively short and a next dragging operation is performed by the user, it indicates that the user has not skipped the advertisement in this operation, that is, has not reached the end point of the advertisement. According to the above embodiment, an invalid interactive operation (not skipping the advertisement) with a short continuous playback duration can be filtered out, and the target video segment where the end point of the advertisement is located can be determined from the middle of the video, thereby improving accuracy of identifying the advertisement inserted in the main content.

According to some embodiments, the playback behavior data includes a number of playback times of the video. Correspondingly, step S220 may be performed in response to the number of playback times of the video being greater than a second threshold. In other words, the target video segment where the content segmentation point of the video is located is determined based on the playback behavior data in response to the number of playback times being greater than the second threshold. The second threshold may be, for example, 100 or 500.

When the number of playback times of the video accumulates to a certain extent and more playback behavior data is obtained, it is more statistically significant. According to the above embodiment, when the number of playback times of the video accumulates to a certain extent, the video content segmentation is triggered, improving accuracy of the video content segmentation.

According to some embodiments, the target duration for the video segmentation and the second threshold for the number of playback times of the video may be determined based on a content segmentation point label of a sample video. For example, the target video segment where the content segmentation point of each sample video is located can be determined based on the specified target duration and second threshold by performing steps S222 to S226 above. Through comparison between a determined target video segment (that is, a predicted value) and a real target video segment (that is, a true value) where the content segmentation point is located, accuracy of identifying the target video segment of the sample video with the current target duration and the second threshold can be determined. The target duration and the second threshold with the highest identification accuracy are determined as the optimal target duration and second threshold.

In step S230, an audio feature of the target video segment is extracted. According to some embodiments, step S230 may include steps S232 and S234.

In step S232, Fourier transform is performed on audio data of the target video segment to obtain a spectrum corresponding to the audio data.

In step S234, feature extraction is performed on the spectrum to obtain the audio feature.

According to the above embodiment, extracting a frequency-domain audio feature of the target video segment can retain a fundamental feature of the audio data while implementing data compression, thereby improving efficiency and accuracy of the video content segmentation.

According to some embodiments, the audio feature may be, for example, a Mel frequency cepstral coefficient (MFCC). Step S234 may include: transforming the spectrum obtained in step S232 into a Mel spectrum by using a Mel-filter bank with equal bank area (Mel-filter bank with same bank area); and performing cepstral analysis on the Mel spectrum to obtain a Mel frequency cepstral coefficient. Specifically, the cepstral analysis includes operations such as taking logarithms and discrete cosine transform (DCT). The $2^{nd}$ to $13^{th}$ coefficients after the discrete cosine transform are used as the Mel frequency cepstral coefficients.

In step S240, the content segmentation point is determined in the target video segment based on the audio feature.

According to some embodiments, the content segmentation point of the video is determined based on a set mapping relationship between the audio feature and the content segmentation point. According to this embodiment, a precise position of the content segmentation point can be quickly determined. For example, the content segmentation point may be accurately determined at the level of seconds.

The mapping relationship may be preset, dynamically set, experimentally set, or set in other approaches, which are all included in the scope of the disclosure.

According to some embodiments, the mapping relationship between the audio feature and the content segmentation point may be expressed as y=f(x), where the independent variable x represents the audio feature and the dependent variable y represents offset time of the content segmentation point in the target video segment.

According to some embodiments, the mapping relationship between the audio feature and the content segmentation point may be determined based on a content segmentation point label of a sample video and an audio feature of a sample target video segment where the content segmentation point label is located. For example, according to steps S232 to S234 above, the audio feature of the sample target video segment of each sample video is extracted. A data pair (x0, y0) formed by the audio feature x0 of the sample target video segment and the offset time y0 of the content segmentation point label within the sample target video segment is used as sample data to obtain the mapping expression y=f(x) between the audio feature x and the content segmentation point y through fitting.

FIG. 3 is a schematic diagram of a video processing system 300 according to some embodiments of the present disclosure. As shown in FIG. 3, the video processing system 300 includes a behavior data collection module 310, a message queue 320, a behavior data analysis module 330, a distributed cache 340, an audio analysis module 350, and a database 360.

The behavior data collection module 310 is configured to collect playback behavior data of a user. The playback behavior data may be recorded in a playback log by a video playback SDK (Software Development Kit) and the playback log is written into an asynchronous message queue 320. The playback behavior data includes, for example, a start position and a target position of the user's behavior of dragging a progress bar, and a position at which the user ends video playback.

The behavior data analysis module 330 consumes the playback behavior data in the message queue 320 and temporarily stores the playback behavior data in the distributed cache 340. When an amount of cached data reaches a threshold (corresponding to the "second threshold" mentioned above), the playback behavior data is analyzed to determine the target video segment where the content segmentation point is located.

The audio analysis module 350 extracts an audio feature of the target video segment. The precise position of the content segmentation point is determined based on the audio feature, and the determined content segmentation point is written into the database 360. The content segmentation points of the video may be provided to subsequent users who play the video, so that the users can skip the video content such as the opening credits and the closing credits based on the content segmentation points.

Figure 4:
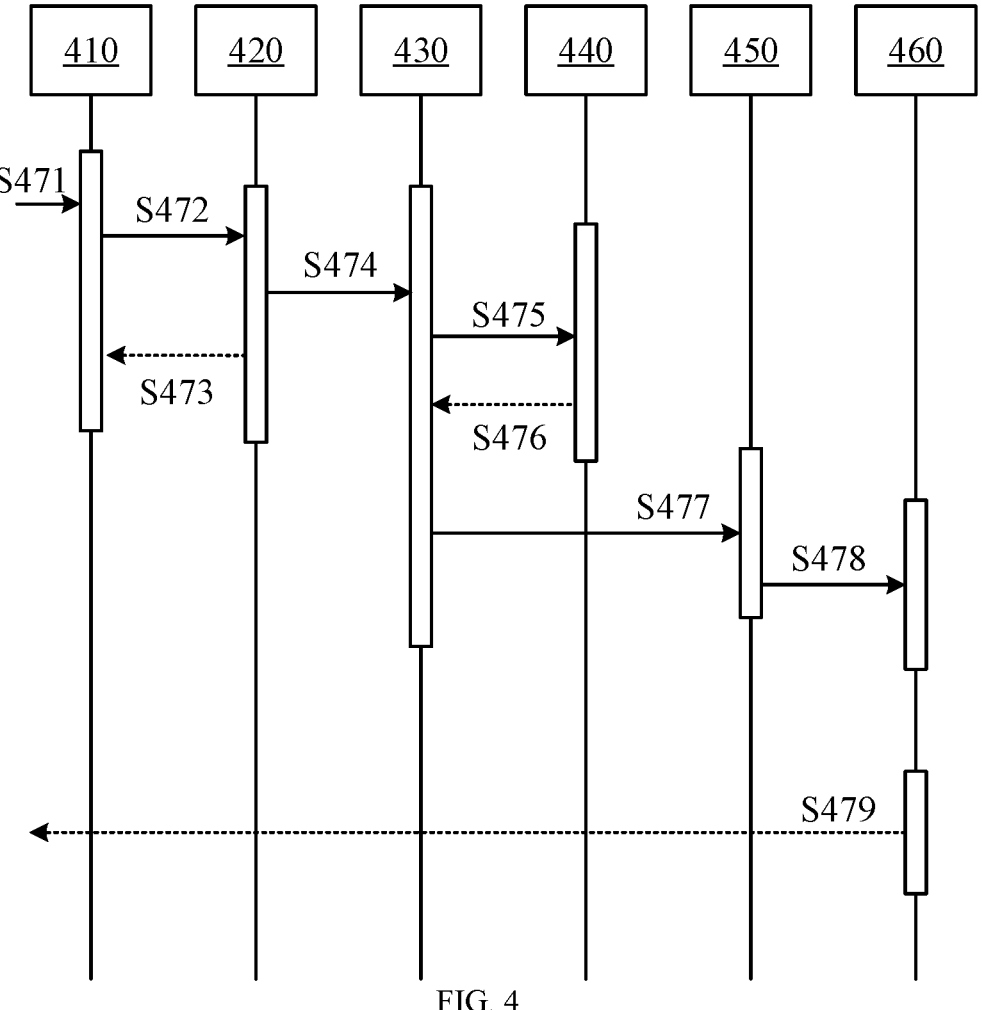
FIG. 4 is an interaction sequence diagram of a video processing system according to some embodiments of the present disclosure.

FIG. 4 is an interaction sequence diagram of a video processing system according to some embodiments of the present disclosure. In the embodiments shown in FIG. 4, the video processing system includes a behavior data collection module 410, a message queue 420, a behavior data analysis module 430, a distributed cache 440, an audio analysis module 450, and a database 460.

In step S471, when the user (a user A) plays the video, the behavior data collection module 410 collects playback behavior data of the user A.

In step S472, the behavior data collection module 410 writes the playback behavior data into the message queue 420.

In step S473, the behavior data collection module 410 receives, from the message queue 420, a message indicating that the playback behavior data has been successfully written.

In step S474, the behavior data analysis module 430 consumes the playback behavior data in the message queue 420, and in step S475, temporarily stores the playback behavior data in the distributed cache 440.

In step S476, when the amount of data cached in the distributed cache 440 reaches a threshold (corresponding to the "second threshold" mentioned above), the behavior data analysis module 430 analyzes the playback behavior data to determine the target video segment where the content segmentation point is located.

In step S477, the audio analysis module 450 obtains the target video segment obtained by the behavior data analysis module 430, extracts the audio feature of the target video segment, and determines the precise position of the content segmentation point based on the audio feature.

In step S478, the audio analysis module 450 writes the determined content segmentation point into the database 460.

In step S479, when another user (a user B different from the user A mentioned above) watches the video, the video playback platform obtains the content segmentation point of the video from the database 460 and provides it to the client device used by the user, so as to automatically skip the opening credits and the closing credits of the video for the user when the user plays the video.

Figure 5:
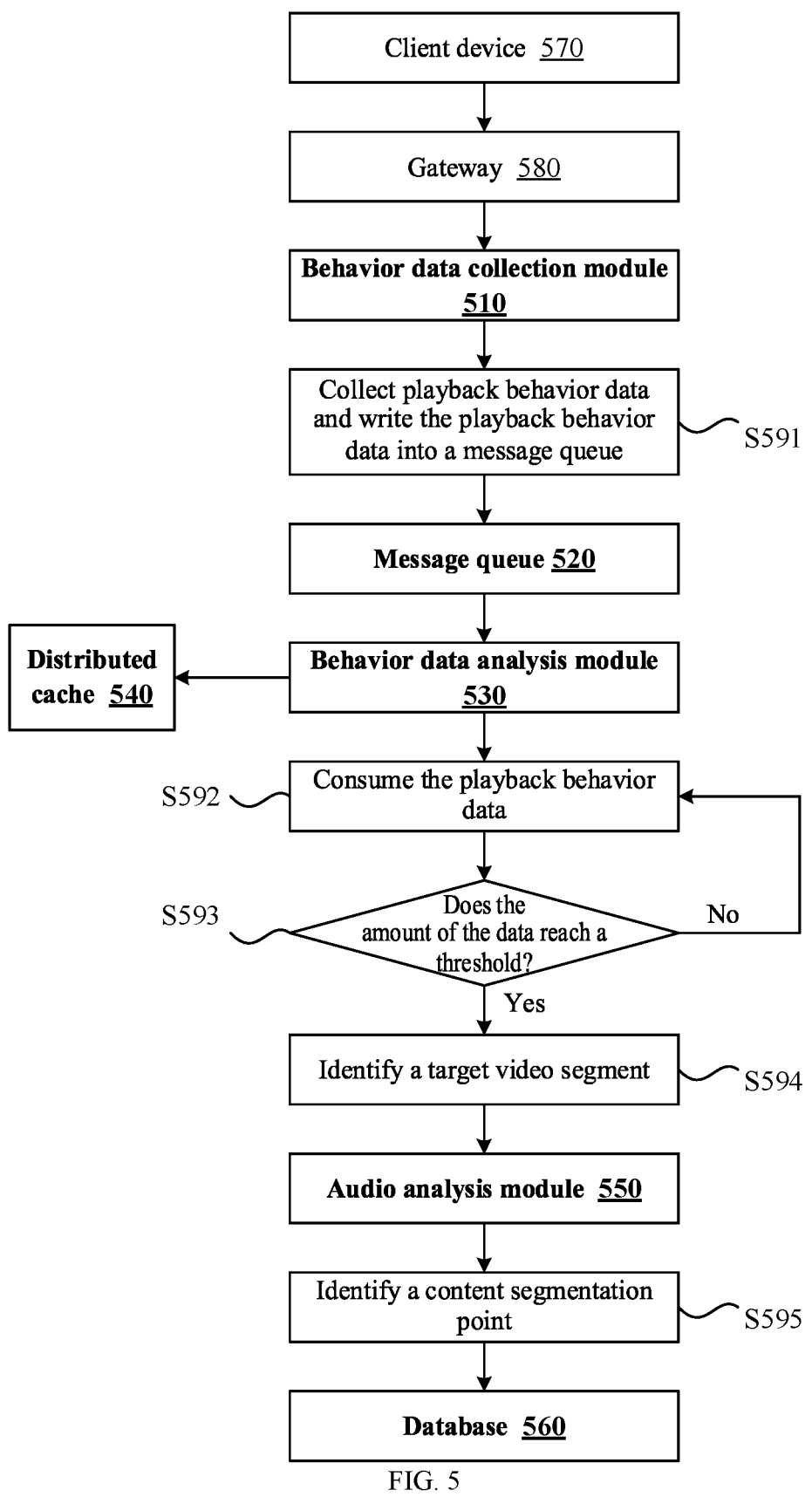
FIG. 5 is a flowchart of a video processing process according to some embodiments of the present disclosure.

FIG. 5 is a flowchart of a video processing process according to some embodiments of the present disclosure. In the embodiments shown in FIG. 5, the video processing system includes a behavior data collection module 510, a message queue 520, a behavior data analysis module 530, a distributed cache 540, an audio analysis module 550, and a database 560.

In step S591, when a client device 570 plays a video, the behavior data collection module 510 collects playback behavior data of the client device 570 through a gateway 580 and writes the playback behavior data into the message queue 520.

In step S592, the behavior data analysis module 530 consumes the playback behavior data in the message queue 520 and temporarily stores the playback behavior data in the distributed cache 540.

In step S593, the behavior data analysis module 530 determines whether the amount of the cached data in the distributed cache 540 has reached a threshold (corresponding to the "second threshold" mentioned above). If the amount of the cached data in the distributed cache has reached the threshold, step S594 is performed. If the amount of the cached data in the distributed cache has not reached the threshold, step S592 is performed to continue to consume the playback behavior data in the message queue 520.

In step S594, the behavior data analysis module 530 analyzes playback behavior data to identify the target video segment where the content segmentation point is located.

In step S595, the audio analysis module 550 obtains the target video segment obtained by the behavior data analysis module 530. The audio feature of the target video segment is extracted, the precise position of the content segmentation point is identified based on the audio feature, and the precise position of the content segmentation point is written into database 560.

Figure 6:
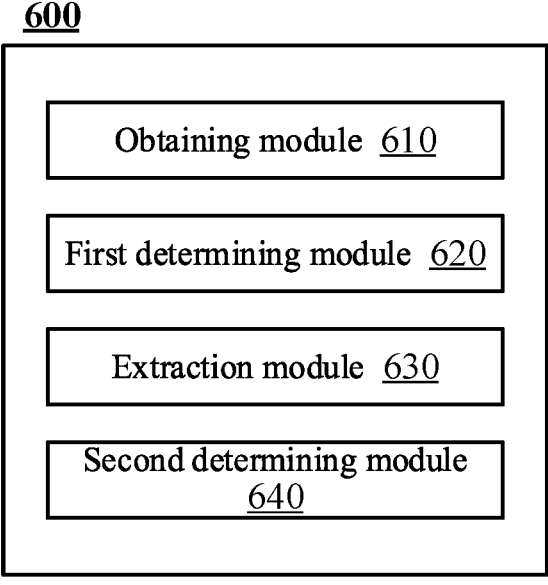
FIG. 6 is a block diagram of a structure of a video processing apparatus according to some embodiments of the present disclosure.

According to some embodiments of the present disclosure, there is provided a video processing apparatus. FIG. 6 is a block diagram of a structure of a video processing apparatus 600 according to some embodiments of the present disclosure. As shown in FIG. 6, the apparatus 600 includes an obtaining module 610, a first determining module 620, an extraction module 630, and a second determining module 640.

The obtaining module 610 is configured to obtain playback behavior data of a video to be processed.

The first determining module 620 is configured to determine, based on the playback behavior data, a target video segment in which a content segmentation point of the video is located, where a type of video content before the content segmentation point is different from a type of video content after the content segmentation point.

The extraction module 630 is configured to extract an audio feature of the target video segment.

The second determining module 640 is configured to determine, based on the audio feature, the content segmentation point from the target video segment.

According to the embodiments of the present disclosure, an approximate position of a content segmentation point of a video, that is, a target video segment, is determined based on playback behavior data of a user for the video. Subsequently, a precise position of the content segmentation point is determined based on the audio feature of the target video segment. Therefore, efficient and accurate segmentation of video content can be realized.

According to some embodiments, the playback behavior data includes a playback time point at which the video is located when a user performs an interactive operation on the video, and where the first determining module includes: a division unit configured to divide the video into a plurality of video segments each with a target duration; a first determining unit configured to: for any video segment of the plurality of video segments, determine a number of interactions of the video segment, where the number of interactions is a number of interactive operations with the playback time point located within the video segment; and a second determining unit configured to determine the target video segment from the plurality of video segments based on the number of interactions of each video segment of the plurality of video segments.

According to some embodiments, the interactive operation includes a playback selection operation, the playback behavior data further includes a continuous playback duration starting from the playback time point, the content segmentation point includes an opening credits end point, and where the first determining unit is further configured to: determine an interactive operation with a continuous playback duration greater than a first threshold as a valid interactive operation; determine a number of valid interactive operations with the playback time point located within the video segment as the number of interactions.

According to some embodiments, the second determining unit is further configured to: determine a video segment with a maximum number of interactions within a first time range as the target video segment, where the first time range is a time range from a start point to a first time point of the video.

According to some embodiments, the interactive operation includes a playback end operation, the content segmentation point includes a closing credits start point, and where the second determining unit is further configured to: determine a video segment with a maximum number of interactions within a second time range as the target video segment, where the second time range is a time range from a second time point to an end point of the video.

According to some embodiments, the playback behavior data includes a number of playback times of the video, and where the first determining module is further configured to: determine, based on the playback behavior data in response to the number of playback times being greater than a second threshold, the target video segment in which the content segmentation point of the video is located.

According to some embodiments, the extraction module includes: a transform unit configured to perform Fourier transform on audio data of the target video segment to obtain a spectrum corresponding to the audio data; and an extraction unit configured to perform feature extraction on the spectrum to obtain the audio feature.

According to some embodiments, the second determining module is further configured to: determine the content segmentation point based on a set mapping relationship between an audio feature and a content segmentation point.

According to some embodiments, the mapping relationship is determined based on a content segmentation point label of a sample video and an audio feature of a sample target video segment in which the content segmentation point label is located.

It should be understood that the various modules and units of the apparatus 600 shown in FIG. 6 may correspond to the steps in the method 200 described in FIG. 2. Therefore, the operations, features, and advantages described above for the method 200 are also applicable to the apparatus 600 and the modules and units included therein. For the sake of brevity, some operations, features, and advantages are not described herein again.

Although specific functions are discussed above with reference to specific modules, it should be noted that the functions of the various modules discussed herein may be divided into a plurality of modules, and/or at least some functions of a plurality of modules may be combined into a single module.

It should be further understood that, various technologies may be described herein in the general context of software and hardware elements or program modules. The various units described above with respect to FIG. 6 may be implemented in hardware or in hardware incorporating software and/or firmware. For example, these units may be implemented as computer program code/instructions configured to be executed in one or more processors and stored in a computer-readable storage medium. Alternatively, these units may be implemented as hardware logic/circuitry. For example, in some embodiments, one or more of the modules 610 to 640 may be implemented together in a system on chip (SoC). The SoC may include an integrated circuit chip (which includes a processor (e.g., a central processing unit (CPU), a microcontroller, a microprocessor, and a digital signal processor (DSP)), a memory, one or more communication interfaces, and/or one or more components in other circuits), and may optionally execute a received program code and/or include an embedded firmware to perform functions.

According to some embodiments of the present disclosure, there is further provided an electronic device, including: at least one processor; and a memory communicatively connected to the at least one processor, where the memory stores instructions that can be executed by the at least one processor, and the instructions, when executed by the at least one processor, cause the at least one processor to perform the video processing method according to the embodiments of the present disclosure.

According to some embodiments of the present disclosure, there is further provided a non-transitory computer-readable storage medium storing computer instructions, where the computer instructions are used to cause a computer to perform the video processing method according to the embodiments of the present disclosure.

According to some embodiments of the present disclosure, there is further provided a computer program product, including computer program instructions, where the computer program instructions, when executed by a processor, cause the video processing method according to the embodiments of the present disclosure to be implemented.

Figure 7:
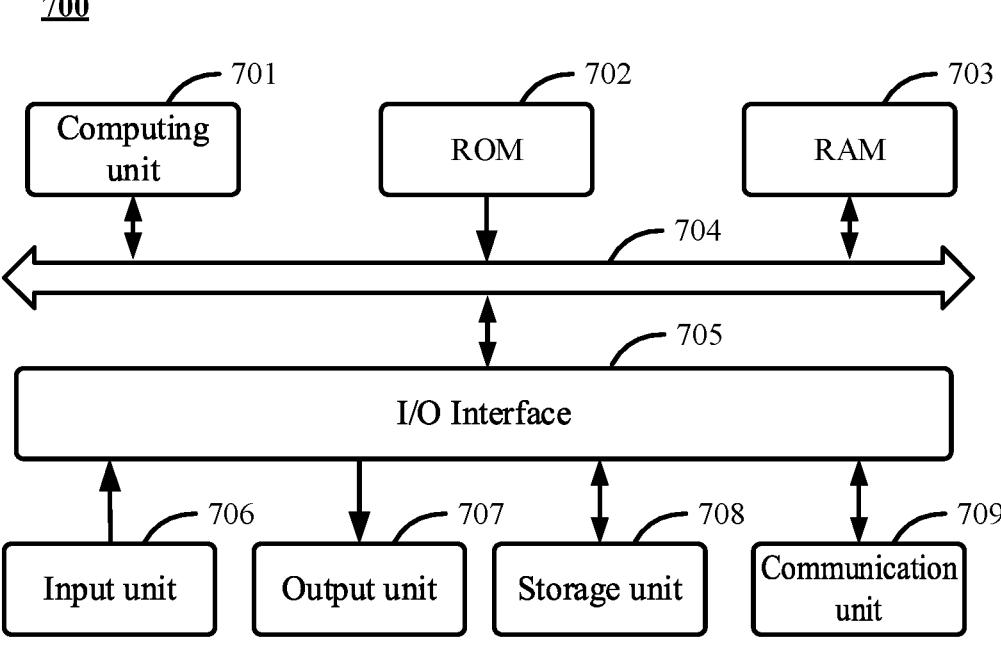
FIG. 7 is a block diagram of a structure of an example electronic device that can be used to implement some embodiments of the present disclosure.

Referring to FIG. 7, a block diagram of a structure of an electronic device 700 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 7, the electronic device 700 includes a computing unit 701. The computing unit may perform various appropriate actions and processing according to a computer program stored in a read-only memory (ROM) 702 or a computer program loaded from a storage unit 708 to a random access memory (RAM) 703. The RAM 703 may further store various programs and data required for the operation of the electronic device 700. The computing unit 701, the ROM 702, and the RAM 703 are connected to each other through a bus 704. An input/output (I/O) interface 705 is also connected to the bus 704.

A plurality of components in the electronic device 700 are connected to the I/O interface 705, including: an input unit 706, an output unit 707, the storage unit 708, and a communication unit 709. The input unit 706 may be any type of device capable of entering information to the electronic device 700. The input unit 706 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 707 may be any type of device capable of presenting information, and may include, but is not limited to, a display, a speaker, a video/audio output terminal, a vibrator, and/or a printer. The storage unit 708 may include, but is not limited to, a magnetic disk and an optical disk. The communication unit 709 allows the electronic device 700 to exchange information/data with other devices through a computer network such as the Internet and/or various telecommunication networks, and may include, but is not limited to, a modem, a network interface card, an infrared communication device, a wireless communication transceiver, and/or a chipset, for example, a Bluetooth device, an 802.11 device, a Wi-Fi device, a WiMax device, or a cellular communication device.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the method 200. For example, in some embodiments, the method 200 may be implemented as a computer software program, which is tangibly contained in a machine-readable medium, such as the storage unit 708. In some embodiments, a part or all of the computer program may be loaded and/or installed onto the electronic device 700 via the ROM 702 and/or the communication unit 709. When the computer program is loaded into the RAM 703 and executed by the computing unit 701, one or more steps of the method 200 described above can be performed. Alternatively, in other embodiments, the computing unit 701 may be configured, by any other appropriate means (for example, by means of firmware), to perform the method 200.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), the Internet, and a blockchain network.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be understood that the methods, systems and devices described above are merely example embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method, comprising:
obtaining playback behavior data of a video to be processed, wherein the playback behavior data comprises a playback time point of the video when a user performs an interactive operation on the video;
determining, based on the playback behavior data, a target video segment in which a content segmentation point of the video is located, wherein a type of video content before the content segmentation point is different from a type of video content after the content segmentation point, wherein the determining the target video segment comprises:
dividing the video into a plurality of video segments each with a target duration;
for any video segment of the plurality of video segments, determining a number of interactions of the video segment, wherein the number of interactions is a number of interactive operations with the playback time point located within the video segment; and
determining the target video segment from the plurality of video segments based on the number of interactions of each video segment of the plurality of video segments;
extracting an audio feature of the target video segment; and
determining the content segmentation point from the target video segment based on the audio feature.

2. The method according to claim 1, wherein the interactive operation comprises a playback selection operation, the playback behavior data further comprises a continuous playback duration starting from the playback time point, and the content segmentation point comprises an opening credits end point, and wherein the determining a number of interactions of the video segment comprises:
determining an interactive operation with a continuous playback duration greater than a first threshold as a valid interactive operation; and
determining a number of valid interactive operations with the playback time point located within the video segment as the number of interactions.

3. The method according to claim 2, wherein the determining the target video segment from the plurality of video segments comprises:
determining a video segment with a maximum number of interactions within a first time range as the target video segment, wherein the first time range is a time range from a start point to a first time point of the video.

4. The method according to claim 1, wherein the interactive operation comprises a playback end operation, the content segmentation point comprises a closing credits start point, and wherein the determining the target video segment from the plurality of video segments comprises:
determining a video segment with a maximum number of interactions within a second time range as the target video segment, wherein the second time range is a time range from a second time point to an end point of the video.

5. The method according to claim 1, wherein the playback behavior data comprises a number of playback times of the video, and wherein the determining a target video segment comprises:
determining, based on the playback behavior data in response to the number of playback times being greater than a second threshold, the target video segment in which the content segmentation point of the video is located.

6. The method according to claim 1, wherein the extracting an audio feature of the target video segment comprises:
performing Fourier transform on audio data of the target video segment to obtain a spectrum corresponding to the audio data; and
performing feature extraction on the spectrum to obtain the audio feature.

7. The method according to claim 1, wherein the determining the content segmentation point from the target video segment comprises:
determining the content segmentation point based on a set mapping relationship between an audio feature and a content segmentation point.

8. The method according to claim 7, wherein the mapping relationship is determined based on a content segmentation point label of a sample video and an audio feature of a sample target video segment in which the content segmentation point label is located.

9. An electronic device, comprising:
a processor; and
a memory communicatively connected to the processor, wherein
the memory stores instructions executable by the processor, and the instructions, when executed by the processor, cause the processor to perform operations comprising:
obtaining playback behavior data of a video to be processed, wherein the playback behavior data comprises a playback time point of the video when a user performs an interactive operation on the video;
determining, based on the playback behavior data, a target video segment in which a content segmentation point of the video is located, wherein a type of video content before the content segmentation point is different from a type of video content after the content segmentation point, wherein determining the target video segment comprises:

dividing the video into a plurality of video segments each with a target duration;

for any video segment of the plurality of video segments, determining a number of interactions of the video segment, wherein the number of interactions is a number of interactive operations with the playback time point located within the video segment, and determining the target video segment from the plurality of video segments based on the number of interactions of each video segment of the plurality of video segments;

extracting an audio feature of the target video segment; and determining the content segmentation point from the target video segment based on the audio feature.

10. The electronic device according to claim 9, wherein the interactive operation comprises a playback selection operation, the playback behavior data further comprises a continuous playback duration starting from the playback time point, and the content segmentation point comprises an opening credits end point, and wherein the determining a number of interactions of the video segment comprises:

determining an interactive operation with a continuous playback duration greater than a first threshold as a valid interactive operation; and determining a number of valid interactive operations with the playback time point located within the video segment as the number of interactions.

11. The electronic device according to claim 10, wherein the determining the target video segment from the plurality of video segments comprises:

determining a video segment with a maximum number of interactions within a first time range as the target video segment, wherein the first time range is a time range from a start point to a first time point of the video.

12. The electronic device according to claim 9, wherein the interactive operation comprises a playback end operation, the content segmentation point comprises a closing credits start point, and wherein the determining the target video segment from the plurality of video segments comprises:

determining a video segment with a maximum number of interactions within a second time range as the target video segment, wherein the second time range is a time range from a second time point to an end point of the video.

13. The electronic device according to claim 9, wherein the playback behavior data comprises a number of playback times of the video, and wherein the determining a target video segment comprises:

determining, based on the playback behavior data in response to the number of playback times being greater than a second threshold, the target video segment in which the content segmentation point of the video is located.

14. The electronic device according to claim 9, wherein the extracting an audio feature of the target video segment comprises:

performing Fourier transform on audio data of the target video segment to obtain a spectrum corresponding to the audio data; and performing feature extraction on the spectrum to obtain the audio feature.

15. The electronic device according to claim 9, wherein the determining the content segmentation point from the target video segment comprises:

determining the content segmentation point based on a set mapping relationship between an audio feature and a content segmentation point.

16. The electronic device according to claim 15, wherein the mapping relationship is determined based on a content segmentation point label of a sample video and an audio feature of a sample target video segment in which the content segmentation point label is located.

17. A non-transitory computer-readable storage medium storing computer instructions, wherein the computer instructions are configured to enable a computer to perform operations comprising:

obtaining playback behavior data of a video to be processed, wherein the playback behavior data comprises a playback time point of the video when a user performs an interactive operation on the video;

determining, based on the playback behavior data, a target video segment in which a content segmentation point of the video is located, wherein a type of video content before the content segmentation point is different from a type of video content after the content segmentation point, wherein determining the target video segment comprises:

dividing the video into a plurality of video segments each with a target duration;

for any video segment of the plurality of video segments, determining a number of interactions of the video segment, wherein the number of interactions is a number of interactive operations with the playback time point located within the video segment; and determining the target video segment from the plurality of video segments based on the number of interactions of each video segment of the plurality of video segments;

extracting an audio feature of the target video segment; and determining the content segmentation point from the target video segment based on the audio feature.

* * * * *